(12) United States Patent
Yasui et al.

(10) Patent No.: US 11,914,348 B2
(45) Date of Patent: Feb. 27, 2024

(54) PLANT OPERATION CONDITION SETTING ASSISTANCE SYSTEM, LEARNING DEVICE, AND OPERATION CONDITION SETTING ASSISTANCE DEVICE

(71) Applicants: CHIYODA CORPORATION, Yokohama (JP); GRIDINC, Tokyo (JP)

(72) Inventors: Takehito Yasui, Yokohama (JP); Shizuka Ikawa, Yokohama (JP); Akifumi Toki, Yokohama (JP); Masaru Sogabe, Tokyo (JP); Yusuke Suwa, Tokyo (JP)

(73) Assignees: CHIYODA CORPORATION, Yokohama (JP); GRIDINC, Tokyo (JP)

( * ) Notice: Subject to any disclaimer, the term of this patent is extended or adjusted under 35 U.S.C. 154(b) by 72 days.

(21) Appl. No.: 17/089,153

(22) Filed: Nov. 4, 2020

(65) Prior Publication Data
US 2021/0055712 A1  Feb. 25, 2021

Related U.S. Application Data

(63) Continuation of application No. PCT/JP2019/016490, filed on Apr. 17, 2019.

(30) Foreign Application Priority Data

May 8, 2018 (JP) ................. 2018-089972

(51) Int. Cl.
*G05B 19/418* (2006.01)
*G06N 3/08* (2023.01)

(52) U.S. Cl.
CPC ..... *G05B 19/4185* (2013.01); *G05B 19/4183* (2013.01); *G05B 19/41865* (2013.01); *G05B 19/41885* (2013.01); *G06N 3/08* (2013.01)

(58) Field of Classification Search
CPC ............ G05B 19/4185; G05B 19/4183; G05B 19/41865; G05B 19/41885
(Continued)

(56) References Cited

U.S. PATENT DOCUMENTS 11,067,955 B2 * 7/2021 Patel ..................... F24F 11/54
2012/0087671 A1 * 4/2012 Eber .................. H04B 10/1143
                                                        398/106
(Continued)

FOREIGN PATENT DOCUMENTS

CN      107045330 A    8/2017
EP       3214509 A2 *  9/2017 ............. G05B 13/04
(Continued)

OTHER PUBLICATIONS

TIPO First Office Action for corresponding TW Application No. 108110199.
(Continued)

*Primary Examiner* — Hien D Khuu
(74) *Attorney, Agent, or Firm* — CANTOR COLBURN LLP (57) ABSTRACT

A plant operating condition setting support system for supporting the setting of an operating condition of a plant that performs a process formed by devices includes: control devices that subject controlled devices to feedback control respectively; and an operating condition setting support device that provides integrated support for the setting of the control devices, which perform feedback control tasks respectively and independently. The operating condition setting support device includes: a measured value multiple acquisition unit that acquires measured values indicating states of the controlled devices, respectively; and a control device adjustment parameter determination unit that determines, based on the measured values acquired, control
(Continued)

device adjustment parameters used by each of the control devices to determine manipulation variables for control that should be input to the controlled devices, according to a policy learned by deep reinforcement learning.

9 Claims, 8 Drawing Sheets

(58) Field of Classification Search
USPC .......................................................... 700/95
See application file for complete search history.

(56) References Cited

U.S. PATENT DOCUMENTS

| | | | |
|---|---|---|---|
| 2013/0016669 A1* | 1/2013 | Hottinen | H04W 74/0808 370/329 |
| 2014/0107993 A1* | 4/2014 | Cheng | G05B 17/02 700/32 |
| 2016/0269932 A1* | 9/2016 | Nemavat | H04W 28/0231 |
| 2017/0031330 A1* | 2/2017 | Shiraishi | G05B 19/042 |
| 2017/0032282 A1* | 2/2017 | Senoo | G06N 20/00 |
| 2017/0211468 A1* | 7/2017 | Devarakonda | F01N 9/00 |
| 2017/0220008 A1 | 8/2017 | Takahashi et al. | |
| 2017/0228644 A1 | 8/2017 | Kurokawa | |
| 2018/0210406 A1* | 7/2018 | Shimizu | G05B 13/0265 |
| 2018/0314233 A1* | 11/2018 | Horiguchi | G05B 19/4183 |
| 2021/0157280 A1* | 5/2021 | Takami | H04Q 9/00 |

FOREIGN PATENT DOCUMENTS

| | | |
|---|---|---|
| EP | 3291035 A1 | 3/2018 |
| JP | 2656637 B2 * | 9/1997 |
| JP | 2004178492 A | 6/2004 |
| JP | 2007011866 A | 1/2007 |
| JP | 2010097254 A | 4/2010 |
| JP | 5172589 B2 * | 3/2013 |
| JP | 2014178853 A | 9/2014 |
| JP | 2017034844 A | 2/2017 |
| WO | 2016086138 A1 | 6/2016 |
| WO | 2018052698 A1 | 3/2018 |

OTHER PUBLICATIONS

TIPO Decision of Rejection Notice for corresponding TW U.S. Appl. No. 10/810,199.
International Search Report for International Application No. PCT/JP2019/016490; dated Jul. 16, 2019.
International Preliminary Report on Patentability and Written Opinion of the International Searching Authority for International Application No. PCT/JP2019/016490; dated Nov. 19, 2020.
ARIPO Office Action for corresponding African Application No. AP/P/2020/012848; dated Jun. 16, 2022.
JPO Notification of Reasons for Refusal for corresponding JP Application No. 2018-089972; dated Dec. 7, 2021.
GCC Patent Office Examination Report for corresponding GC Application No. 2019-37533; dated Apr. 29, 2021.
Indonesian Office Action corresponding to Application No. P00202008699; dated Jan. 3, 2023.
AU Office Action for corresponding AU Patent Application No. 2019265059; dated Oct. 25, 2023.

* cited by examiner

PLANT OPERATION CONDITION SETTING ASSISTANCE SYSTEM, LEARNING DEVICE, AND OPERATION CONDITION SETTING ASSISTANCE DEVICE

CROSS REFERENCE TO PRIOR APPLICATIONS

This application is a continuation under 35 U.S.C. § 120 of PCT/JP2019/016490, filed Apr. 17, 2019, which is incorporated herein reference and which claimed priority to Japanese Application No. 2018-089972, filed May 8, 2018. The present application likewise claims priority under 35 U.S.C. § 119 to Japanese Application No. 2018-089972, filed May 8, 2018, the entire content of which is also incorporated herein by reference.

BACKGROUND OF THE INVENTION

1. Field of the Invention

The present invention relates to a plant operating condition setting support system for supporting the setting of a plant operating condition and to a learning device and an operating condition setting support device that can be used in the plant operating condition setting support system.

2. Description of the Related Art

In plants for producing chemical products and industrial products, a series of processes are performed by a large number of devices such as a reactor and a heating furnace. A large number of manipulation variables for controlling the large number of devices respectively change a process state. In plants in which a multistep process is performed, a large number of manipulation variables can interact with each other in a complicated manner. It is therefore not easy to predict an impact from changing a manipulation variable, and a control device adjustment parameter for determining a manipulation variable is set by an experienced operator to operate the plant.

For example, patent document 1 and patent document 2 propose a technology of controlling a plant like this that includes a plurality of control systems that could mutually interfere.

Patent document 1 discloses a technology of providing, between three or more systems of control loops, a non-interference element that cancels mutual interference between the control loops. A non-interference element is calculated by approximating a transfer function of each control loop and a transfer function of an interfering element interfering from another control loop to a response form of a first-order lag system that includes a waste time.

Patent document 2 discloses a technology of building a relationship between a valve position of a control valve and a variable representing a process state that varies depending on the valve position in the form of an equation in a steady state, calculating a CV value indicating a target valve position of the control valve based on an analytic solution expression derived for each control valve according to the equation, calculating a CV value indicating a current valve position of the control valve determined by a sensed value and calculating a deviation e between the two CV values, and subjecting the process state to feedback control based on the deviation e.

[patent document 1] JP2007-11866
[patent document 2] JP2010-97254

SUMMARY OF THE INVENTION

It is difficult to approximate mathematically the behavior of a process value in each of a plurality of control systems with high precision. It is more difficult to predict the behavior of a plant value based on the mathematically approximated representation of a plurality of control systems with high precision in the presence of an unpredictable disturbance in the plurality of control systems that could interact in a complicated manner. A technology that enables stable operation of a plant even when a disturbance that could destabilize the behavior of a plant occurs is called for.

In this background, a general purpose of the present invention is to provide a technology for realizing stable operation of a plant.

A plant operating condition setting support system according to an embodiment of the present invention is a plant operating condition setting support system for supporting the setting of an operating condition of a plant that performs a process formed by a plurality of devices, including: a plurality of control devices that subject one or more controlled devices in the plurality of devices to feedback control respectively; and an operating condition setting support device that provides integrated support for the setting of the plurality of control devices, which perform a plurality of feedback control tasks respectively and independently. Each of the plurality of control devices includes: a measured value acquisition unit that acquires a measured value indicating a state of a controlled device; a control device adjustment parameter acquisition unit that acquires a control device adjustment parameter for determining a manipulation variable for control input to the controlled device; a manipulation variable for control determination unit that determines the manipulation variable for control based on the measured value acquired by the measured value acquisition unit and the control device adjustment parameter acquired by the control device adjustment parameter acquisition unit; and a manipulation variable for control input unit that inputs the manipulation variable for control determined by the manipulation variable for control determination unit to the controlled device. The operating condition setting support device includes: a measured value multiple acquisition unit that acquires a plurality of measured values indicating states of the plurality of controlled devices controlled by the plurality of control devices, respectively; and a control device adjustment parameter determination unit that determines, based on the plurality of measured values acquired by the measured value multiple acquisition unit, a plurality of control device adjustment parameters used by each of the plurality of control devices to determine manipulation variables for control that should be input to the plurality of controlled devices, according to a policy learned by deep reinforcement learning.

Another embodiment of the present invention relates to an operating condition setting support device. The device is an operating condition setting support device for providing integrated support for the setting of a plurality of control devices for subjecting one or more controlled devices that are among a plurality of devices forming a process performed in a plant to feedback control respectively, including: a measured value multiple acquisition unit that acquires a plurality of measured values indicating states of a plurality of controlled devices controlled by the plurality of control devices, respectively; and a control device adjustment parameter determination unit that determines, based on the plurality of measured values acquired by the measured value multiple acquisition unit, a plurality of control device adjustment parameters used by each of the plurality of control devices to determine manipulation variables for control that should be input to the plurality of controlled devices, according to a policy learned by deep reinforcement learning.

Another embodiment of the present invention relates to a learning device. The learning device includes: an action determination unit that acquires a plurality of measured values indicating states of a plurality of controlled devices forming a process performed in a plant and outputs a plurality of control device adjustment parameters used by each of the plurality of control devices for subjecting the plurality of controlled devices to automatic feedback control respectively; and a valuation function unit that calculates a valuation of a set of i) a plurality of measured values indicating states of the plurality of controlled devices occurring when the plurality of control devices control the plurality of controlled devices by using the control device adjustment parameters output by the action determination unit and ii) the control device adjustment parameters used. The valuation function unit is learned in such a manner as to reduce an error between i) an expected value of a reward value that would be obtained when the control device adjustment parameter determination unit determines the control device adjustment parameters that are input to the controlled devices while the plurality of controlled devices are in the states indicated by the plurality of measured values, the manipulation variables for control determined by the plurality of control devices by using the control device adjustment parameters determined are input to the plurality of controlled devices to update the states of the plurality of controlled devices, and optimum control device adjustment parameters continue to be selected afterwards, and ii) a valuation calculated by the valuation function unit.

Optional combinations of the aforementioned constituting elements, and implementations of the invention in the form of methods, apparatuses, systems, recording mediums, and computer programs may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
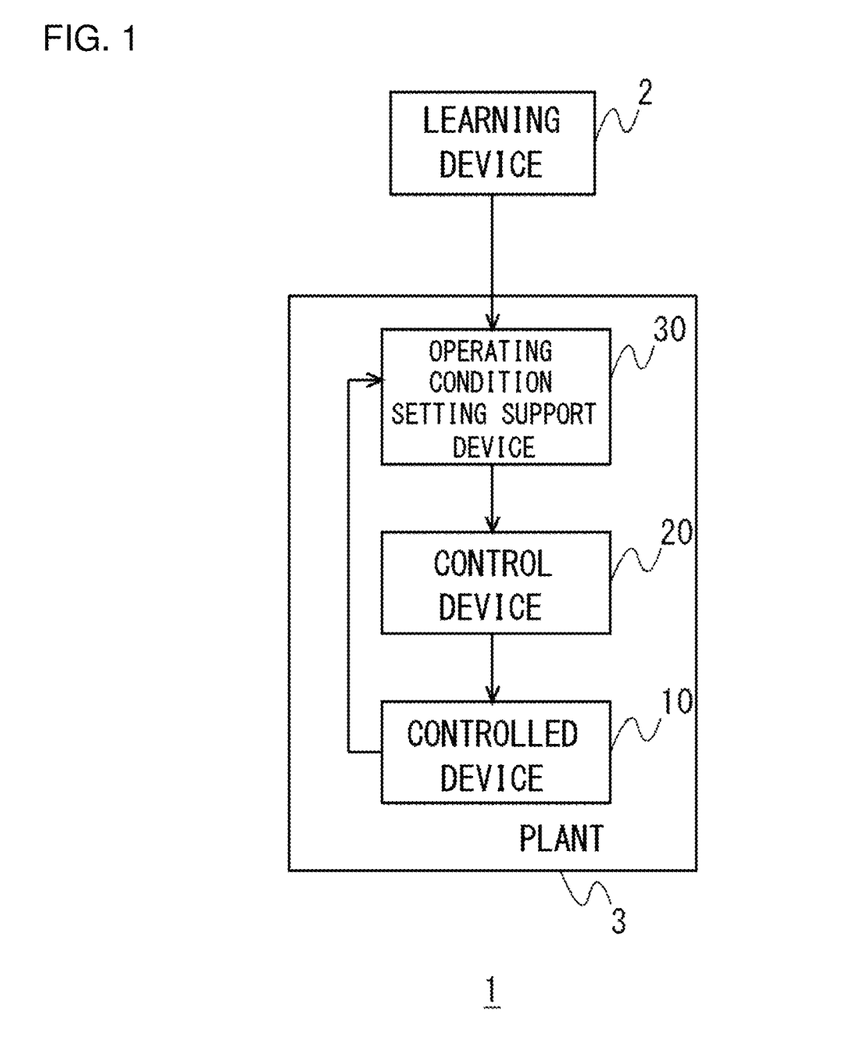
FIG. 1 shows an overall configuration of a plant operating condition setting support system according to an embodiment.

FIG. 1 shows an overall configuration of a plant operating condition setting support system according to an embodiment. A plant operating condition setting support system I for supporting the setting of an operating condition of a plant 3 is provided with a plant 3 for producing chemical products, industrial products, etc., and a learning device 2 for performing deep reinforcement learning for learning a policy for determining a plurality of control device adjustment parameters used to set the operating condition of the plant 3. The plant 3 includes a controlled device 10 that forms a process performed in the plant 3, a plurality of control devices 20 for subjecting one or more controlled devices 10 to feedback control respectively, and an operating condition setting support device 30 for providing integrated support for the setting of the plurality of control devices 20, which perform a plurality of feedback control tasks respectively and independently. The operating condition setting support device 30 determines a plurality of control device adjustment parameters used to determine manipulation variables for control fed by each of the plurality of control devices 20 to the plurality of controlled devices 10 according to the policy learned by deep reinforcement learning performed in the learning device 2.

Figure 2:
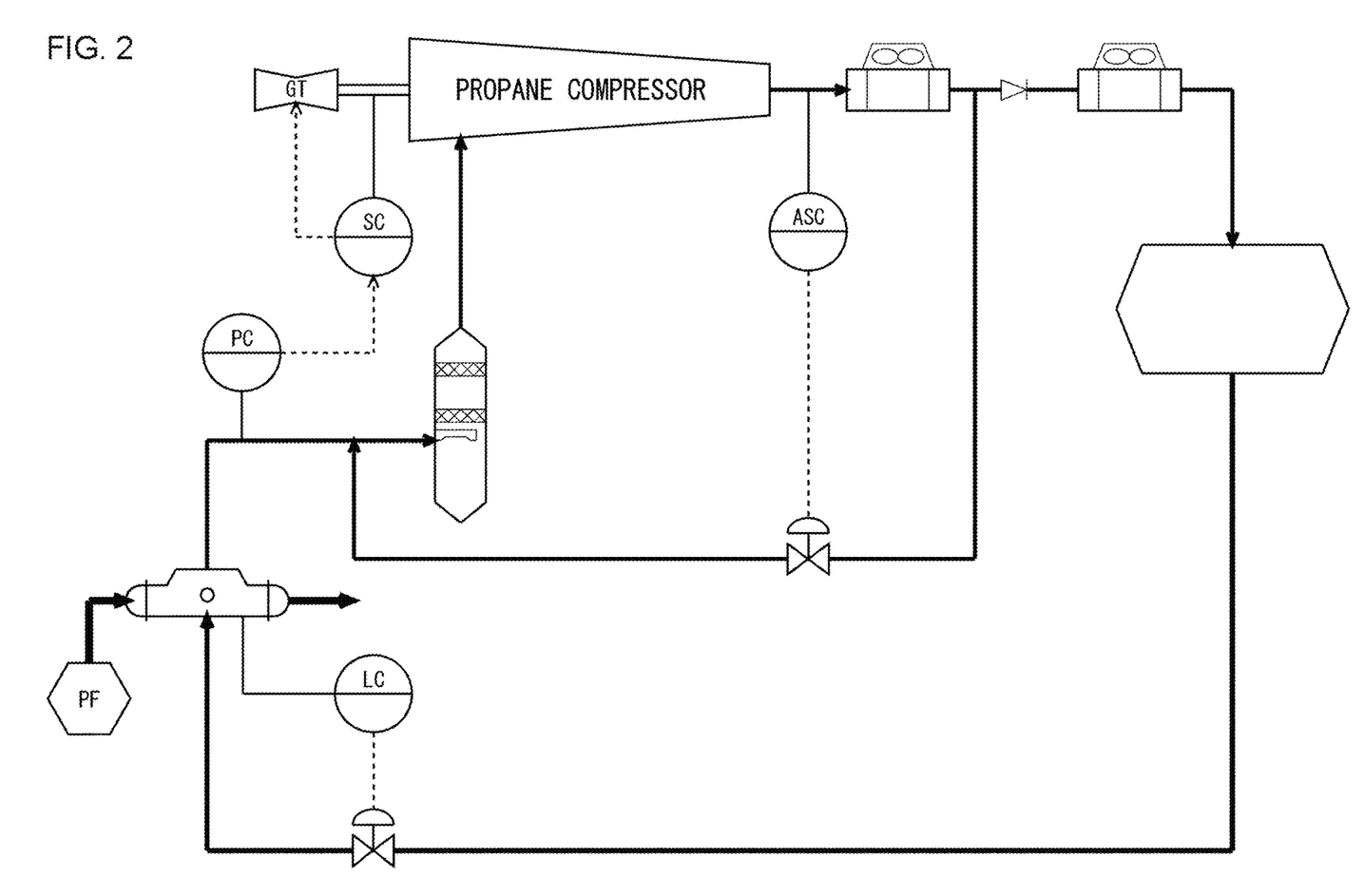
FIG. 2 shows an exemplary configuration of a compressor system that exemplifies a process subject to control.

FIG. 2 shows an exemplary configuration of a compressor system that exemplifies a process subject to control. The compressor system shown in the figure includes, as a plurality of controlled devices 10 that form the process, a heat exchanger for cooling a subject of cooling by using a propane coolant, a propane compressor for compressing propane gas evaporated in the heat exchanger, etc. The compressor system further includes, as the control devices 20 that control each of the plurality of controlled devices 10 independently and automatically, PID controllers such as a liquid level controller LC, a pressure controller PC, a rotation speed controller SC, and an anti-surge controller ASC.

The liquid level controller LC controls the opening of a supply valve for supplying the propane coolant in accordance with the liquid level of the propane coolant in order to maintain the liquid level of the propane coolant in the heat exchanger constant. The pressure controller PC controls the rotation speed controller SC in accordance with the pressure of the propane gas evaporated from the heat exchanger in order to maintain the pressure of the propane gas introduced into the propane compressor constant. The rotation speed controller SC controls the rotation speed of a gas turbine GT for adjusting the pressure of the propane gas introduced into the propane compressor in response to a command from the pressure controller PC. The anti-surge controller ASC controls the opening of the anti-surge valve in accordance with the pressure of the propane gas at the exit of the propane compressor in order to inhibit a surge in the propane compressor. Of these PID controllers, the rotation speed controller SC is operated in response to a command from the pressure controller PC. The other three PID controllers automatically control the controlled devices 10 respectively and independently.

When the amount of subject of cooling decreases rapidly in this compressor system due, for example, to a disturbance, the amount of cold consumption decreases so that the amount of propane evaporated in the heat exchanger decreases, and the liquid level of the propane coolant increases. When this occurs, the liquid level controller LC decreases the opening of the valve so as to reduce the amount of propane coolant flowing in and maintain the liquid level of the propane coolant constant. When the amount of propane evaporated decreases, the measured value of the pressure input to the pressure controller PC decreases. In response, the pressure controller PC directs the rotation speed controller SC to decrease the rotation speed of the gas turbine GT.

However, when the pressure of the propane gas introduced into the propane compressor decreases as a result of the decrease in the rotation speed of the gas turbine GT, the measured value of the pressure input to the anti-surge controller ASC decreases so that the anti-surge controller ASC increases the opening of the anti-surge valve in order to avoid a surge in the propane compressor. This causes the measured value of the pressure input to the pressure controller PC to increase so that the pressure controller PC directs the rotation speed controller SC to increase the rotation speed of the gas turbine GT.

When the pressure of the propane gas introduced into the propane compressor increases as a result of the increase in the rotation speed of the gas turbine GT, the measured value of the pressure input to the anti-surge controller ASC increases so that the anti-surge controller ASC decreases the opening of the anti-surge valve. This decreases the measured value of pressure input to the pressure controller PC so that the pressure controller PC directs the rotation speed controller SC to decrease the rotation speed of the gas turbine GT again.

Thus, in the presence of mutual interference between impacts from automatic feedback control tasks in a process including a plurality of control systems subject to automatic and independent feedback control by the plurality of control devices 20, respectively, the behavior may become unstable. For example, control occurs in opposite directions periodically to result in hunting. Even in such a case, the system is expected to converge to a stable operation eventually if proper PID parameters are set in the respective PID controllers. If the disturbance that has induced the oscillation or the variation caused by a change in the operating condition is serious or abrupt, however, it may take a long period of time before the system converges to a stable operation, or hunting may remain.

Figure 3:
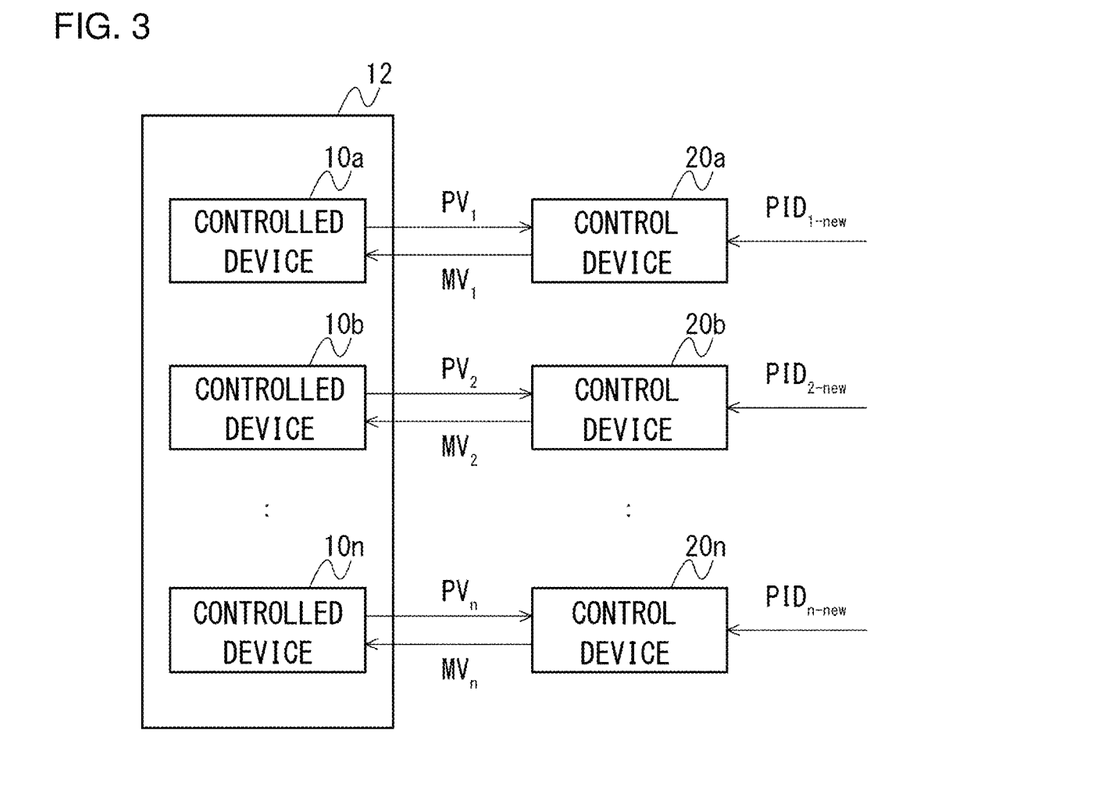
FIG. 3 schematically shows a control method in a related-art plant.

FIG. 3 schematically shows a control method in a related-art plant. A process 12 performed in the plant is formed by a plurality of controlled devices 10a, 10b, . . . , 10n. The plurality of controlled devices 10a, 10b, . . . , 10n are controlled by control devices 20a, 20b, . . . , 20n, respectively. In the case of the example shown in FIG. 2, the plurality of controlled devices 10a, 10b, . . . , 10n are the heat exchanger, the propane compressor, etc. The plurality of control devices 20a, 20b, . . . , 20n are the liquid level controller LC, the pressure controller PC, the rotation speed controller SC, the anti-surge controller ASC, etc.

In the related-art plant, it is difficult to predict the impact from changing the three types of control device adjustment parameters (hereinafter, referred to as "PID parameters") including the proportional gain (P gain), the integral gain (I gain), and the differential gain (D gain), which are used by the plurality of control devices 20 for PID control. Therefore, the PID parameters are hardly changed. If a change is necessary, the operator has input the parameter to the relevant control device 20 manually. Therefore, If the state of the process 12 becomes unstable due, for example, to a disturbance, automatic control by the mutually interfering control devices 20a, 20b, . . . , 20n need be stabilized by an operator input of appropriate PID parameters to the respective control devices 20. The time required for convergence to stable operation has been dependent on the experience and skill of the operator.

Figure 4:
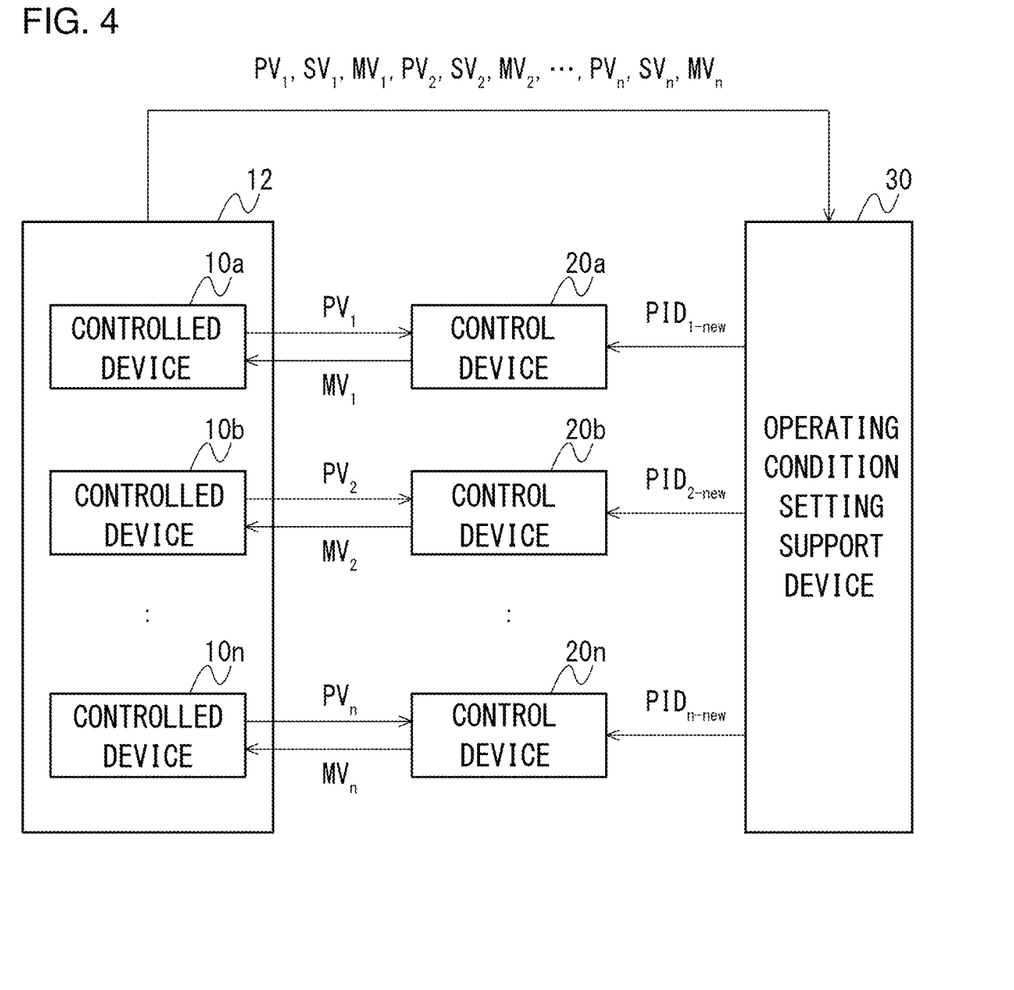
FIG. 4 schematically shows a configuration of an operating condition setting support device according to the embodiment.

FIG. 4 schematically shows a configuration of an operating condition setting support device according to the embodiment. The operating condition setting support device 30 determines the PID parameters that should be input to the plurality of control devices 20 in accordance with a policy learned by deep reinforcement learning in the learning device 2 as described below. The policy determines the PID parameters that maximize the valuation, based on an action-value function for calculating a valuation of a combination of a plurality of values that can be set as PID parameters, from a plurality of measured values indicating the status of the plurality of controlled devices 10, the target values of the values subject to control in the plurality of controlled devices 10, and the values of the manipulation variables for control input to the plurality of controlled devices 10. The action-value function is learned by the learning device 2 in such a manner as to calculate a high valuation for PID parameter that allows the values subject to control to approach target values promptly while also controlling the process as a whole to be stable. In an alternative example, the action-value function used to determine the PID parameters may use values of other parameters in addition to or in place of the measured values, the target values of the values subject to control, and the values of the manipulation variables for control, for the purpose of calculating the valuation of a combination of a plurality of values that can be set as PID parameters. For example, the value of a current or past PID parameter, the value of a parameter indicating a disturbance factor, etc. may be used. Alternatively, the change rate or the amount of change of those parameters may be used in addition to or in place of the absolute values of the parameters.

The plurality of PID parameters determined by the operating condition setting support device 30 may be presented to the operator to allow the operator to input the PID parameter in the control device 20 by referring to the plurality of PID parameters presented. Alternatively, the operating condition setting support device 30 may input the PID parameter directly to the control device 20. This reduces the labor of the operator significantly and allows the plant 3 to be operated in a stable manner irrespective of the experience and skill of the operator.

Figure 5:
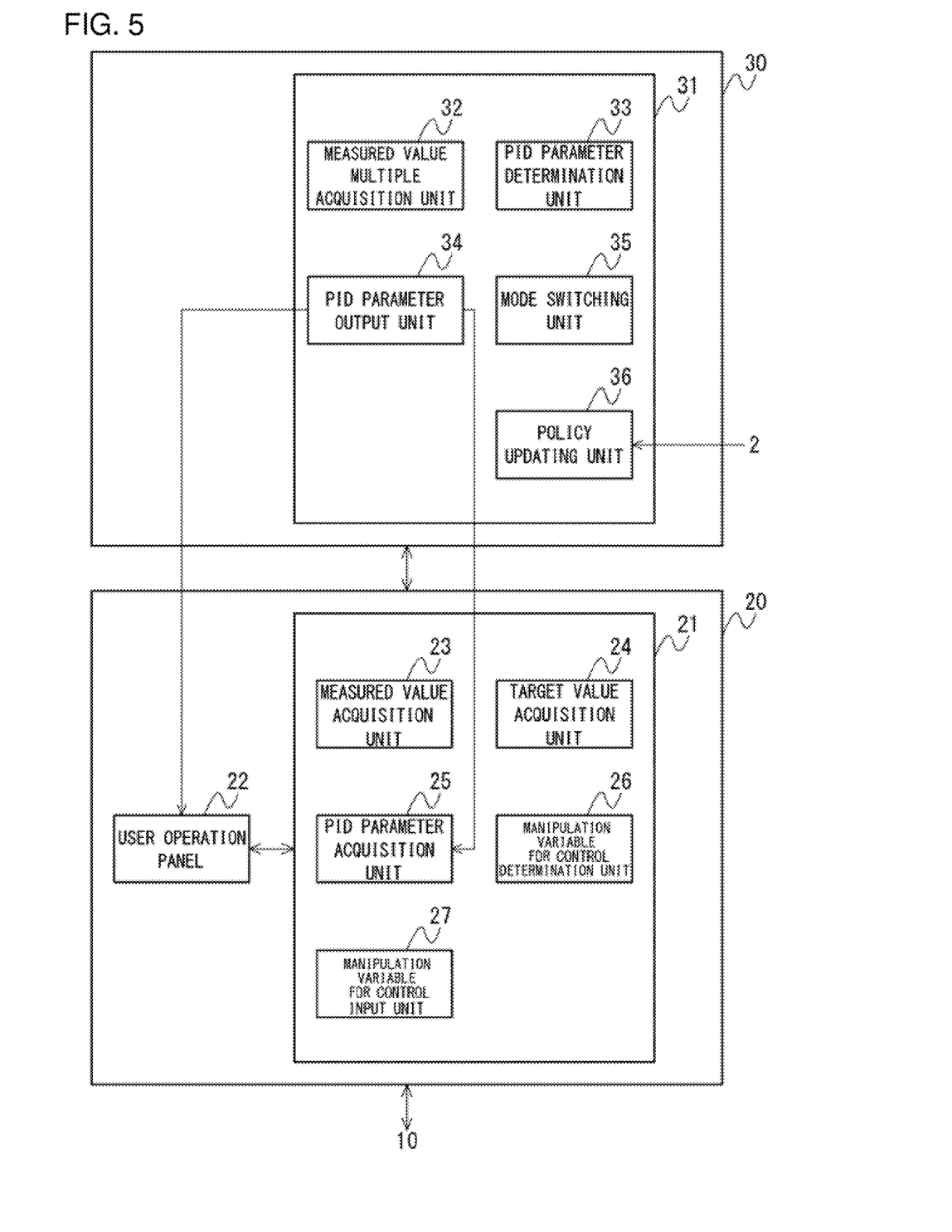
FIG. 5 shows a configuration of the operating condition setting support device and the control device according to the embodiment.

FIG. 5 shows a configuration of the operating condition setting support device and the control device according to the embodiment. The control device 20 is provided with a control unit 21 and a user operation panel 22.

The user operation panel 22 displays on a display device a plurality of measured values indicating the status of a plurality of controlled devices 10 comprised in the plant 3, the values of the manipulation variables for control set by the control devices 20 in the controlled devices 10, the values of the PID parameters set in the control devices 20, and the measured values of the outputs indicating a result of operating the plant 3. The user operation panel 22 also acknowledges an input of the value of a PID parameter from the operator.

The control device 20 is provided with a measured value acquisition unit 23, a target value acquisition unit 24, a PID parameter acquisition unit 25, a manipulation variable for control determination unit 26, and a manipulation variable for control input unit 27. The features are implemented in hardware components such as a CPU and a memory in an arbitrary computer, a program loaded into the memory, etc. The figure depicts functional blocks implemented by the cooperation of these elements. Therefore, it will be understood by those skilled in the art that the functional blocks may be implemented in a variety of manners by hardware only, software only, or by a combination of hardware and software.

The measured value acquisition unit 23 acquires a measured value indicating the state of the controlled device 10. In the case the target value of the values subject to control in the controlled device 10 is variable, the target value acquisition unit 24 acquires the target value. In the example shown in FIG. 2, for example, the target value of the liquid level of the propane coolant in the heat exchanger is a fixed value, but the target value of the rotation speed of the gas turbine is variably controlled by the pressure controller LC. Therefore, the target value acquisition unit 24 acquires the target value of the rotation speed of the gas turbine from the pressure controller LC.

The PID parameter acquisition unit 25 acquires the PID parameter used to determine the manipulation variables for control input to the controlled device 10. In an automatic mode in which the operating condition setting support device 30 automatically inputs the PID parameter to the control device 20, the operating condition setting support device 30 communicates the plurality of PID parameters determined to the respective control devices 20. The control device 20 directly acquires the PID parameter communicated from the operating condition setting support device 30 by using the PID parameter acquisition unit 25. In a manual mode in which the operator inputs the PID parameter to the control device 20, the operating condition setting support device 30 presents the plurality of PID parameters determined to the operator via the user operation panel 22. The control device 20 acquires the PID parameter input by the operator by using the PID parameter acquisition unit 25.

The manipulation variable for control determination unit 26 determines the manipulation variables for control that should be set in the controlled device 10, based on the measured value acquired by the measured value acquisition unit 23, the target value acquired by the target value acquisition unit 24, and the PID parameter acquired by the PID parameter acquisition unit 25. The manipulation variable for control determination unit 26 may determine the manipulation variables for control by using an arbitrary publicly known PID control technology. The manipulation variable for control input unit 27 inputs the manipulation variables for control determined by the manipulation variable for control determination unit 26 to the controlled device 10.

The operating condition setting support device 30 is provided with a control unit 31. The control unit 31 is provided with a measured value multiple acquisition unit 32, a PID parameter determination unit 33, a PID parameter output unit 34, a mode switching unit 35, and a policy updating unit 36. These features may also be implemented in a variety of manners by hardware only, software only, or by a combination of hardware and software.

The measured value multiple acquisition unit 32 acquires a plurality of measured values indicating the states of the plurality of controlled devices 10 controlled by the plurality of control devices 20, respectively. The measured value multiple acquisition unit 32 acquires all measured values indicating the states of all controlled devices 10 controlled by the plurality of control devices 20 provided with integrated support by the operating condition setting support device 30.

The PID parameter determination unit 33 determines, based on the plurality of measured values acquired by the measured value multiple acquisition unit 32, the plurality of PID parameters used to determine the manipulation variables for control that the plurality of control devices 20 should respectively input to the plurality of controlled devices 10. Of the PID parameters that can be selected in the state defined by the measured values acquired by the measured value multiple acquisition unit 32, the PID parameter determination unit 33 determines the PID parameter that maximizes the valuation, based on the action-value function learned by the learning device 2. As described below, the action-value function is a neural network that outputs a valuation for each of a plurality of PID parameters that can be selected, in response to an input of a plurality of measured values indicating the states of the plurality of controlled devices 10. The action-value function is learned by deep reinforcement learning in the learning device 2.

The mode switching unit 35 indicates, based on the policy learned by deep reinforcement learning, to the control device 20 whether to exercise control in an automatic mode in which the control device 20 automatically inputs a manipulation variable for control to the controlled device 10 or in a manual mode in which the control device 20 inputs a manipulation variable for control to the controlled device 10 in response to an instruction on the manipulation variable for control from the operator.

The policy updating unit 36 acquires, as a policy, a learned neural network from the learning device 2 and updates the PID parameter determination unit 33. This makes it possible to acquire a neural network with its precision improved by the learning device 2 even during the operation of the plant 3 and to update the action-value function for determining the action. Therefore, a more suitable PID parameter is selected than otherwise.

Figure 6:
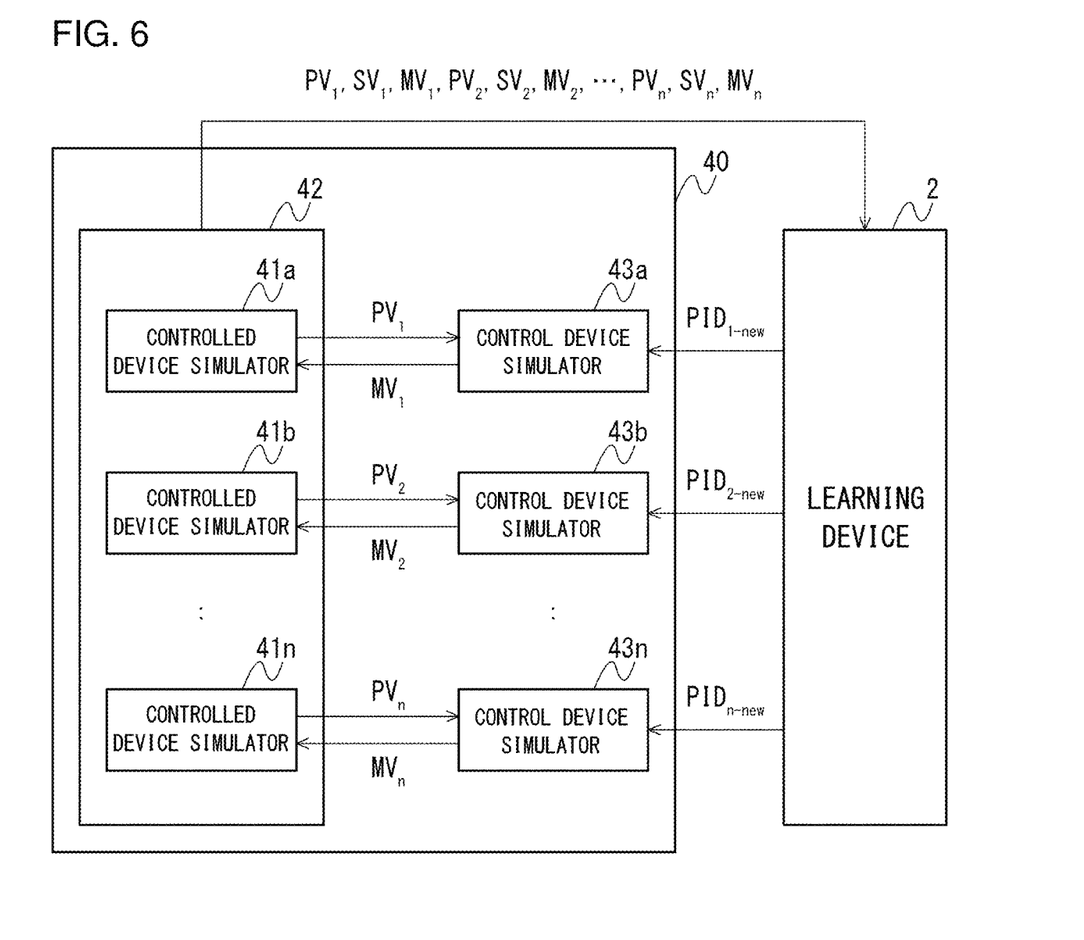
FIG. 6 schematically shows a configuration of the learning device according to the embodiment.

FIG. 6 schematically shows a configuration of the learning device according to the embodiment. The learning device 2 uses a simulator 40 to perform deep reinforcement learning for learning a policy for integrated control of the behavior of all controlled devices 10 forming the process 12 performed in the plant 3. The simulator 40 includes a process simulator 42 for simulating the process 12 performed in the plant 3, and control device simulators 43 that simulate each of the control devices 20 that control the plurality of controlled devices 10 respectively. The process simulator 42 includes controlled device simulators 41 that respectively simulate the plurality of controlled devices 10 forming the process 12. The learning device 2 determines the PID parameter that each control device simulator 43 uses to determine a manipulation variable for control and inputs the determined PID parameter to the simulator 40. The learning device 2 repeats a step of acquiring a plurality of measured values indicating a result of control exercised by using the input PID parameter multiple times in a time sequence to learn the behavior of the plant 3. The learning device 2 learns a policy for integrated determination of the PID parameter that allows the plurality of control devices 20 to work in coordination to operate the plant 3 in a stable manner.

Figure 7:
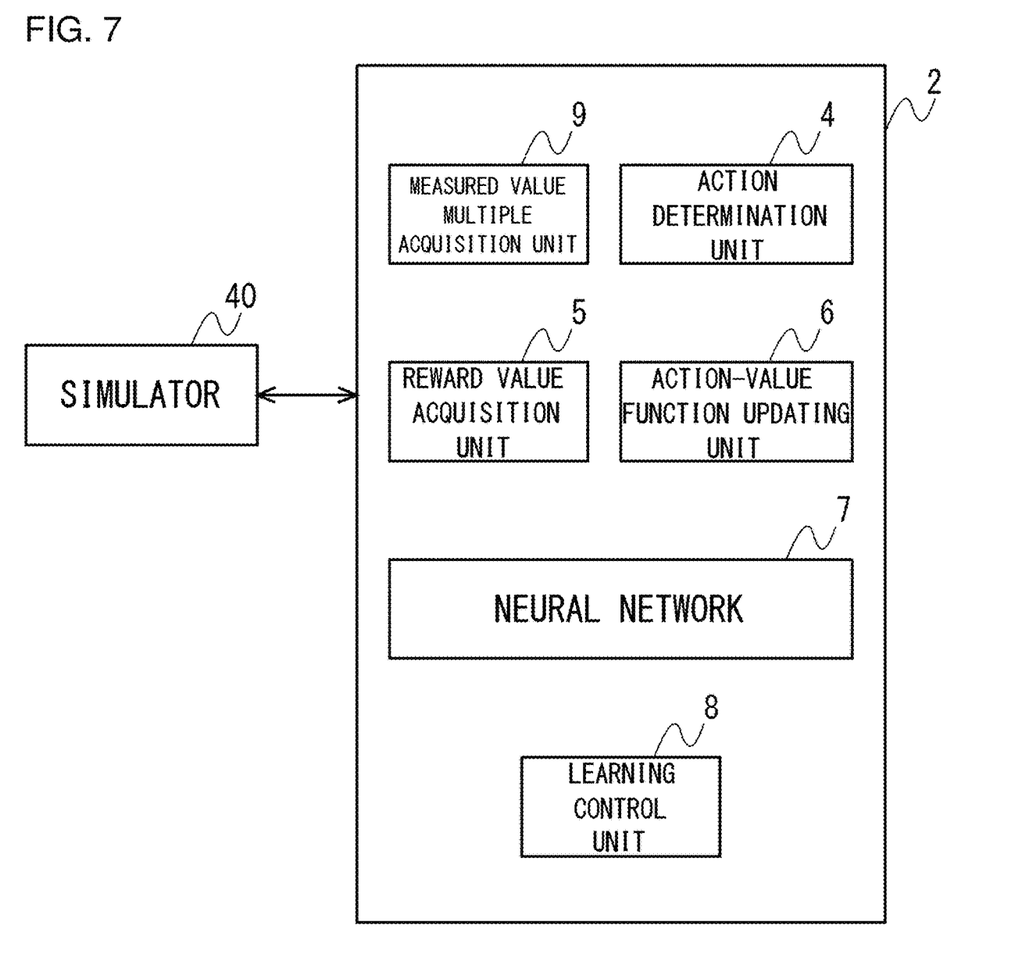
FIG. 7 shows a configuration of the learning device according to the embodiment.

FIG. 7 shows a configuration of the learning device 2 according to the embodiment. The learning device 2 is provided with an action determination unit 4, a reward value acquisition unit 5, an action-value function updating unit 6, a neural network 7, a learning control unit 8, and a measured value multiple acquisition unit 9. These features may also be implemented in a variety of manners by hardware only, software only, or by a combination of hardware and software.

The learning device 2 learns, by deep reinforcement learning, a policy whereby the PID parameter determination unit 33 of the operating condition setting support device 30 determines the values of the PID parameters that should be set in the respective control devices 20.

Reinforcement learning determines a policy that maximizes a reward obtained by an action of an agent in a given environment taken upon the environment. Steps in which the agent takes an action upon the environment, and the environment updates the state, evaluates the action, and notifies the agent of the state and a reward are repeated in a time sequence. The action-value function and the policy are optimized to maximize the expected value of the sum of the reward obtained.

In this embodiment, the number of combinations of options for the state s of the plant 3 defined by the measured values of the plurality of controlled devices 10 and the action a of inputting the PID parameters to the plurality of control devices 20 in the state s will be enormous. Therefore, deep reinforcement learning in which the action-value function is approximated by the neural network 7 is performed. The algorithm of deep reinforcement learning may be deep Q-learning network (DQN), or double DQN, or any other arbitrary algorithm. The neural network 7 may be a feed-forward neural network such as a multi-layer perceptron neural network, a simple perceptron neural network, and a convolution neural network. Alternatively, a neural network of any of other arbitrary forms may be used. Input to the input layer of the neural network 7 are all measured values PVn indicating the states of all controlled devices 10, the target values SVn of the values subject to control in all controlled devices 10, and the values MVn of the manipulation variables for control input from all control devices 20 to all controlled devices 10. The values of the PID parameter that can be set in the control device 20 is output from the output layer. In the case the action-value function used to determine the PID parameter uses values of other parameters in addition to or in place of the measured values PVn, the target values SVn of the values subject to control, and the values MVn of the manipulation variables for control, the values of the other parameters used are equally input to the input layer of the neural network 7.

The learning control unit 8 determines the policy and detail of learning and performs deep reinforcement learning. The learning control unit 8 sets an initial condition in the simulator 40 to start a trial and repeats predetermined times the input of a PID parameter to the simulator 40 and the acquisition of a plurality of measured values indicating the state of the plant 3, which is controlled by the input PID parameter, that occurs after a predetermined period of time. When the predetermined number of steps are completed, the learning control unit 8 ends one trial and sets an initial condition again to start a next trial. For example, in the case the behavior of the plant 3 occurring when a disturbance or a change in the operating condition occurs during the steady operation of the plant 3 should be learned, the learning control unit 8 causes a controlled device simulator 11 and a control device simulator 43 forming the simulator 40 to start learning, with the measured values, the target values, and the values of the manipulation variables for control during the steady operation being set as initial values. The learning control unit 8 generates a disturbance or a change in the operating condition at a randomly determined point of time and input a value corresponding to the disturbance or the change in the operating condition to the simulator 40. When the behavior of the plant 3 at start-up of the plant 3 should be learned, the learning control unit 8 causes the simulator 40 to start learning, with the values occurring when the operation is being stopped being set as initial values. The learning control unit 8 causes the simulator 40 to learn the behavior of the plant 3 occurring until the system converges to a constant operation. When the behavior of the plant 3 occurring as the plant 3 is brought to a stop should be learned, the learning control unit 8 causes the simulator 40 to start learning, with the values occurring in a steady operation being set as initial values. The learning control unit 8 directs the simulator 40 to stop the operation of the plant 3 and to learn the behavior of the plant 3 occurring until the operation of the plant 3 is stopped. If a predetermined condition, in which it is clear that the trial being performed does not produce a favorable result, is met such as when the reward value obtained is less than a predetermined value, the learning control unit 8 may terminate the trial before the steps are completed a predetermined number of times and start the next trial.

The action determination unit 4 determines the plurality of PID parameters input to the simulator 40. The action determination unit 4 determines the PID parameters randomly or based on the action-value function represented by the neural network 7. The action determination unit 4 may select, in accordance with a publicly known arbitrary algorithm such as s-greedy method, whether determining the PID parameters randomly or determining the PID parameters that maximize the valuation expected based on the action-value function. This facilitates efficient learning while enabling miscellaneous and diversified options to be tried, therefore reduces the time before the learning converges.

The measured value multiple acquisition unit 9 acquires a plurality of measured values indicating the states of the plurality of controlled device simulators 41 from the simulator 40. The reward value acquisition unit 5 acquires the reward value for the state of the plant 3 indicated by the plurality of measured values acquired by the measured value multiple acquisition unit 9. The reward value represents a stability index indicating the properness of the state of the process 12 performed in the plant 3 in numerical terms. More specifically, the reward value represents a stability index indicating the properness of the state of the process in numerical terms according to one or more of the following criteria: (1) the difference between the plurality of measured values and the control target values is small; (2) the plurality of measured values do not oscillate; and (3) the time required for the plurality of measured values to be stabilized is short. For example, the reward value is determined such that the smaller the difference between the measured values and the control target values, the smaller the oscillation of the measured values, and the shorter the time required for the measured values to be stabilized, the higher the reward value.

The action-value function updating unit 6 updates the action-value function represented by the neural network 7 based on the reward value acquired by the reward value acquisition unit 5. The action-value function updating unit 6 causes the weights in the neural network 7 to be learned such that the output of the action-value function of a set of actions taken by the action determination unit 4 in a given state s approaches the expected value of the sum of i) the reward value acquired by the reward value acquisition unit 5 as a result of the action taken by the action determination unit 4 in the given state s and ii) the reward value that would be obtained if the optimum action is continued subsequently. In other words, the action-value function updating unit 6 adjusts the weights of the connections in the layers of the neural network 7 such that an error between i) the sum of the reward value actually obtained by the reward value acquisition unit 5 and a value derived from multiplying the expected value of the reward value that would be obtained subsequently by a time discount and ii) the output value of the action-value function decreases. This allows the weights to be updated and facilitates the learning so that the action value calculated by the neural network 7 approaches a true value.

Figure 8:
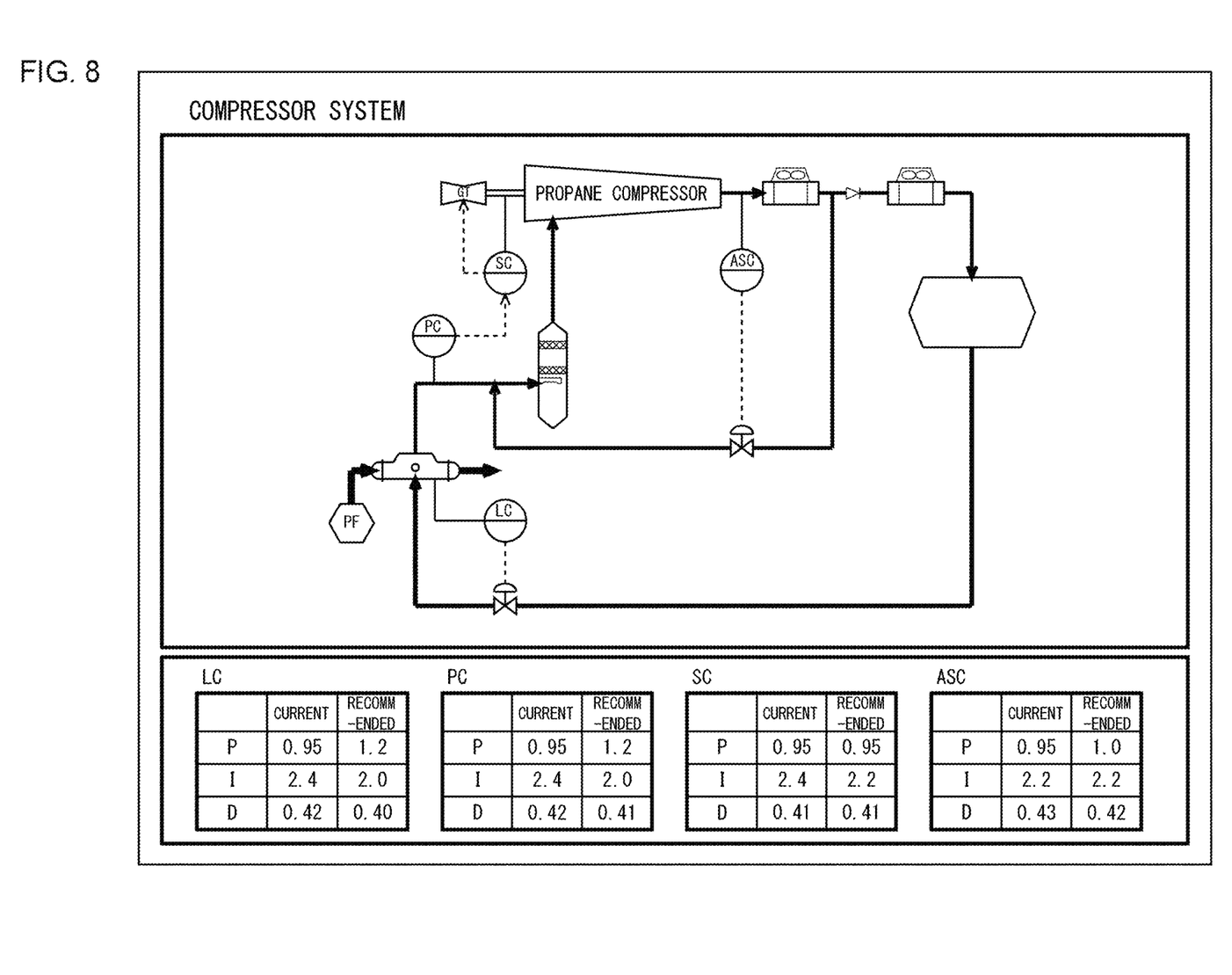
FIG. 8 shows an example of a screen view displayed on the display device of the user operation panel.

FIG. 8 shows an example of a screen view displayed on the display device of the user operation panel. The screen displays the process flow diagram of the plant 3, the current value of the PID parameters set in the respective PID controllers, and the recommended values of the PID parameters determined by the operation condition setting support device 30. When the operator inputs the PID parameter with reference to the recommended value shown on the display device, the input PID parameter is acquired by the PID parameter acquisition unit 25 of the control device 20 and is used by the manipulation variable for control determination unit 26 to determine the manipulation variables for control. This stabilizes the behavior of the plant 3 promptly even when a factor that could destabilize the behavior of the plant 3 occurs.

Described above is an explanation based on an exemplary embodiment. The embodiment is intended to be illustrative only and it will be understood by those skilled in the art that various modifications to constituting elements and processes could be developed and that such modifications are also within the scope of the present invention.

The technology of the present invention can be used in a plant in which a plurality of control devices control a plurality of controlled devices (devices subject to control). While a plant that includes a plurality of control systems each subject to PID control is described in the embodiment, the technology of the present invention is equally applicable to a plant that includes control systems based on any other arbitrary control scheme such as P control and PI control.

The control device adjustment parameter determination unit may determine the plurality of control device adjustment parameters according to a policy learned by deep reinforcement learning for learning a policy for determining the plurality of control device adjustment parameters, the policy being based on the measured value of the controlled device, the control target value, and the manipulation variable for control occurring when the plant is operated, on a reward value that represents a stability index indicating an evaluation of the measured value, the control target value, and the manipulation variable for control in numerical terms, and on the control device adjustment parameter used to determine the manipulation variable for control.

The plant operating condition setting support system may further include: a learning device that performs the deep reinforcement learning. The learning device may include: an action determination unit that acquires a plurality of measured values indicating states of the plurality of controlled devices and outputs a plurality of control device adjustment parameters used by each of the plurality of control devices; and a valuation function unit that calculates a valuation of a set of i) a plurality of measured values indicating states of the plurality of controlled devices occurring when the plurality of control devices control the plurality of controlled devices by using the control device adjustment parameters output by the action determination unit and ii) the control device adjustment parameters used. The valuation function unit may be learned in such a manner as to reduce an error between i) an expected value of a reward value that would be obtained when the control device adjustment parameter determination unit determines the control device adjustment parameters that are input to the controlled devices while the plurality of controlled devices are in the states indicated by the plurality of measured values, the manipulation variables for control determined by the plurality of control devices by using the control device adjustment parameters determined are input to the plurality of controlled devices to update the states of the plurality of controlled devices, and optimum control device adjustment parameters continue to be selected afterwards, and ii) a valuation calculated by the valuation function unit.

The reward value may represent a stability index indicating a properness of a state of the process in numerical terms.

The reward value may represent a stability index indicating a properness of a state of the process in numerical terms according to one or more of the following criteria: (1) a difference between the plurality of measured values and the control target values is small; (2) the plurality of measured values do not oscillate; or (3) time required for the plurality of measured values to be stabilized is short.

The control device adjustment parameter determination unit may determine the plurality of control device adjustment parameters used when the plant operation is started or brought to a stop, according to a policy learned by deep reinforcement learning that uses the measured values and the manipulation variables for control occurring when the plant operation is started or brought to a stop and the control device adjustment parameters.

The control device adjustment parameter determination unit may determine the plurality of control device adjustment parameters used when a disturbance occurs or when an operating condition is changed during the plant operation, according to a policy learned by deep reinforcement learning that uses the measured values and the manipulation variables for control occurring when a disturbance occurs or when an operating condition is changed during the plant operation and the control device adjustment parameter.

The operating condition setting support device may further include a mode switching unit that indicates, based on the policy learned by deep reinforcement learning, to the control device whether to exercise control in an automatic mode in which the control device automatically inputs a manipulation variable for control to the controlled device or in a manual mode in which the control device inputs a manipulation variable for control to the controlled device in response to an instruction on the manipulation variable for control from the operator.

The operating condition setting support device may communicate the plurality of control device adjustment parameters determined by the control device adjustment parameter determination unit to the respective control devices, and the control device may acquire the control device adjustment parameter communicated from the operating condition setting support device by using the control device adjustment parameter acquisition unit.

The operating condition setting support device may present the plurality of control device adjustment parameters determined by the control device adjustment parameter determination unit to the operator, and the control device may acquire the control device adjustment parameter input by the operator by using the control device adjustment parameter acquisition unit.

What is claimed is:

1. A plant operating condition setting support system for supporting a setting of an operating condition of a plant that performs a process wherein the process is formed by a plurality of devices being subject to independent feedback control, impacts from mutual interference between respective feedback control tasks, the plant operating condition setting support system comprising:
a plurality of control devices that subject one or more controlled devices in the plurality of devices to feedback control respectively; and
an operating condition setting support device that provides integrated support for the setting of the plurality of control devices, which perform a plurality of feedback control tasks respectively and independently, wherein
each of the plurality of control devices includes:
a measured value acquisition circuit that acquires a measured value indicating a state of a controlled device;
a control device adjustment parameter acquisition circuit that acquires a proportional gain/integral gain/differential gain (PID) parameter for determining a manipulation variable for control input to the controlled device;
a manipulation variable for control determination circuit that determines the manipulation variable for control based on the measured value acquired by the measured value acquisition circuit and the PID parameter acquired by the control device adjustment parameter acquisition circuit; and
a manipulation variable for control input circuit that inputs the manipulation variable for control determined by the manipulation variable for control determination circuit to the controlled device,
wherein the operating condition setting support device includes:
a measured value multiple acquisition circuit that acquires a plurality of measured values indicating states of the plurality of controlled devices controlled by the plurality of control devices, respectively; and
a control device adjustment parameter determination circuit that determines, based on the plurality of measured values acquired by the measured value multiple acquisition circuit, and a plurality of PID parameter used by each of the plurality of control devices to determine manipulation variables for control input to the plurality of controlled devices, according to a policy learned by deep reinforcement learning,
wherein
the control device adjustment parameter determination circuit determines the plurality of PID parameters according to a policy learned by deep reinforcement learning for learning a policy for determining the plurality of PID parameters, the policy being based on the measured value of the controlled device, the control target value, and the manipulation variable for control occurring when the plant is operated, on a reward value that represents a stability index indicating an evaluation of the measured value, the control target value, and the manipulation variable for control in numerical terms, and on the PID parameter used to determine the manipulation variable for control.

2. The plant operating condition setting support system according to claim 1, further comprising:
a learning device that performs the deep reinforcement learning, wherein
the learning device includes:
an action determination circuit that acquires a plurality of measured values indicating states of the plurality of controlled devices and outputs a plurality of PID parameter used by each of the plurality of control devices; and
a valuation function circuit that calculates a valuation of a set of i) a plurality of measured values indicating states of the plurality of controlled devices occurring when the plurality of control devices control the plurality of controlled devices by using the PID parameter output by the action determination circuit and ii) the PID parameter used, wherein
the valuation function circuit is learned in such a manner as to reduce an error between i) an expected value of a reward value that would be obtained when the control device adjustment parameter determination circuit determines the PID parameter that are input to the controlled devices while the plurality of controlled devices are in the states indicated by the plurality of measured values, the manipulation variables for control determined by the plurality of control devices by using the PID parameter determined are input to the plurality of controlled devices to update the states of the plurality of controlled devices, and optimum PID parameter continue to be selected afterwards, and ii) a valuation calculated by the valuation function circuit.

3. The plant operating condition setting support system according to claim 2, wherein
the reward value represents a stability index indicating a properness of a state of the process in numerical terms.

4. The plant operating condition setting support system according to claim 2, wherein
the reward value represents a stability index indicating a properness of a state of the process in numerical terms according to one or more of the following criteria: (1) a difference between the plurality of measured values and the control target values is small; (2) the plurality of measured values do not oscillate; and (3) time required for the plurality of measured values to be stabilized is short.

5. The plant operating condition setting support system according to claim 2, wherein
the control device adjustment parameter determination circuit determines the plurality of PID parameter used when the plant operation is started or brought to a stop, according to a policy learned by deep reinforcement learning that uses the measured values and the manipulation variables for control occurring when the plant operation is started or brought to a stop and the PID parameter.

6. The plant operating condition setting support system according to claim 2, wherein
the control device adjustment parameter determination circuit determines the plurality of PID parameter used when a disturbance occurs or when an operating condition is changed during the plant operation, according to a policy learned by deep reinforcement learning that uses the measured values and the manipulation variables for control occurring when a disturbance occurs or when an operating condition is changed during the plant operation and the PID parameter.

7. The plant operating condition setting support system according to claim 2, wherein
the operating condition setting support device further includes a mode switching circuit that indicates, based on the policy learned by deep reinforcement learning, to the control device whether to exercise control in an automatic mode in which the control device automatically inputs a manipulation variable for control to the controlled device or in a manual mode in which the control device inputs a manipulation variable for control to the controlled device in response to an instruction on the manipulation variable for control from the operator.

8. The plant operating condition setting support system according to claim 1, wherein
- the operating condition setting support device communicates the plurality of PID parameter determined by the control device adjustment parameter determination circuit to the respective control devices, and
- the control device acquires the PID parameter communicated from the operating condition setting support device by using the control device adjustment parameter acquisition circuit.

9. The plant operating condition setting support system according to claim 1, wherein
- the operating condition setting support device presents the plurality of PID parameter determined by the control device adjustment parameter determination circuit to the operator, and
- the control device acquires the PID parameter input by the operator by using the control device adjustment parameter acquisition circuit.

* * * * *